United States Patent [19]

Kawabata

[11] Patent Number: 5,062,003
[45] Date of Patent: Oct. 29, 1991

[54] IMAGE FORMING APPARATUS

[75] Inventor: Hidetoshi Kawabata, Toyohashi, Japan

[73] Assignee: Minolta Camera Kabushiki Kaisha, Osaka, Japan

[21] Appl. No.: 548,510

[22] Filed: Jul. 5, 1990

[30] Foreign Application Priority Data

Jul. 6, 1989 [JP] Japan .................................. 1-176331

[51] Int. Cl.$^5$ ...................... H04N 1/036; H04N 1/29; G01D 15/14; G03G 21/00
[52] U.S. Cl. .................................. 358/300; 355/202; 346/160
[58] Field of Search ............... 358/300, 401, 296, 302; 346/160, 108; 355/202

[56] References Cited

U.S. PATENT DOCUMENTS 4,696,562 9/1987 Urata .................................. 355/202
4,803,517 2/1989 Bruce, Jr. .
4,806,967 2/1989 Newbury .

FOREIGN PATENT DOCUMENTS 50-85340 7/1975 Japan .
51-146237 12/1976 Japan .
51-147327 12/1976 Japan .

Primary Examiner—Benjamin R. Fuller
Assistant Examiner—Scott A. Rogers
Attorney, Agent, or Firm—Burns, Doane, Swecker & Mathis

[57] ABSTRACT

A photoconductor is stretched between a developing unit and a fixing unit more flatly than the developing unit and the fixing unit, and other necessary image forming devices are disposed in the empty spaces around the photoconductor which are formed in the upper and lower portions of the photoconductor between the developing unit and the fixing unit. An exposure section provided for copying operation is arranged along the upper portion, and along the lower portion, a paper feed section and a laser print head are arranged.

18 Claims, 10 Drawing Sheets

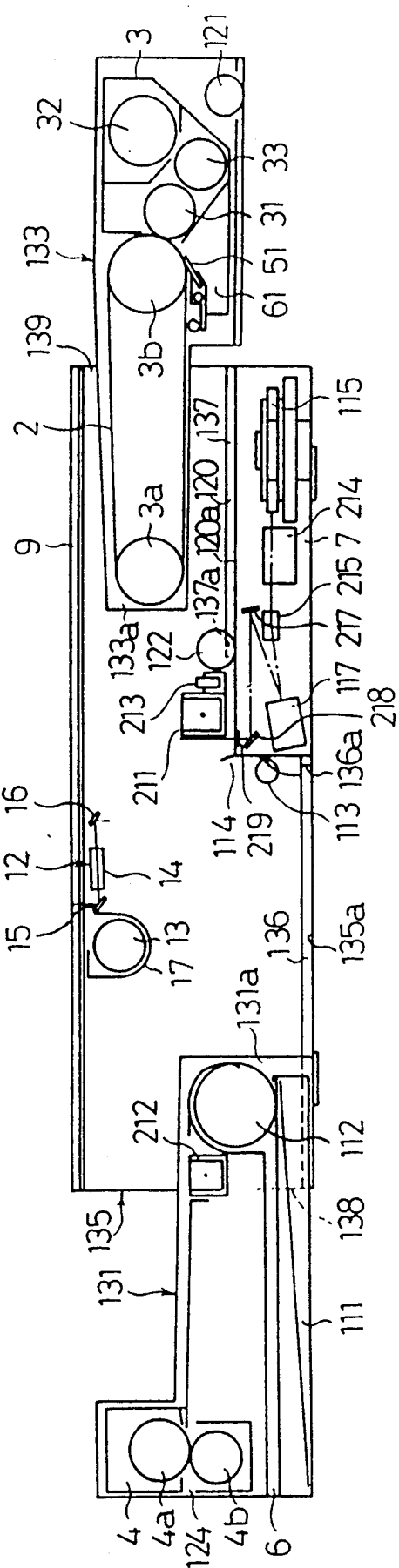

IMAGE FORMING APPARATUS

BACKGROUND OF THE INVENTION

1. Field of the Invention

The present invention relates to an image forming apparatus for use as a copying machine or a laser printer, and more particularly to a small-sized and inexpensive image forming apparatus suitable for personal use.

2. Description of Related Art

FIG. 1 shows a typical image forming system which is provided with a drum photoconductor and is adapted to conventional copying machines and laser printers. In U.S. Pat. No. 4,696,562, there is disclosed an apparatus which is provided with an endless belt photoconductor.

In the apparatus shown in the FIG. 1, there are disposed an exposure optical system b above a photoconductive drum a and a transfer charger c and the like under the photoconductive drum a respectively. Around the photoconductive drum a, there are also arranged a developing unit d, cleaner e, eraser f and charger g with a space h for exposure. The diameter of the photoconductive drum a is set as small as possible (for instance, about 30 mm) in order to be able to accommodate necessary devices around the photoconductive drum a. A transport path i for transporting a transfer material is formed between the photoconductive drum a and the transfer charger c which is disposed under the drum, and a fixing unit j is arranged at the end of the path i.

In the apparatus disclosed in the U.S. Patent, various devices necessary for image forming operation are disposed around the endless belt photoconductive drum similarly to the conventional apparatus as illustrated in the FIG. 1. The apparatus is provided with an exposure section for carrying out copying operations and a laser print head so that it can be used either in copying machines or printers.

The copying machine shown in the FIG. 1 is designed to make it's size smaller and thinner by making the diameter of the photoconductive drum a as small as possible. However, there is a limit in making the size smaller since sufficient space is required for arranging various image forming devices including the exposure optical system b around the photoconductive drum a. On the contrary, it become rather bulky since various devices required for image forming operation are collectively disposed around the photoconductive drum a. Moreover, the fixing unit j becomes more bulky downward than those image forming devices since it is arranged in the transfer material transporting path i on the same level of the transfer section. Under the circumstances, copying machines have not been manufactured sufficiently thinner yet.

In order to reduce the number of image forming devices, it may be considered to properly use one charger as a charging device and a transfer device during two rounds of rotations of the photoconductive drum a. Even in this case, however, the diameter of the drum a becomes about 100 mm when JIS A4 size sheet is used since sufficient peripheral length of the photoconductive drum a is required for practicable copying operation, which eventually makes the size of the copying machine more larger.

In the apparatus disclosed in the U.S. Patent, on the other hand, image forming devices may be arranged without increasing the size in the upper and lower portions since the belt-shaped photoconductor is stretched crossways. However, there is not specific consideration which is given to the arrangement of the image forming devices and fixing device, and therefore, the machine can not be manufactured small and thin. Especially, when exposure section for copying operation and a laser beam print head are provided together for use both copying machines and printers as the one disclosed in the U.S. Patent, the machine becomes totally large in size.

With recent popularization of word processors, personal computers and the like for personal use, a small-sized and inexpensive copying machine which can also be used as a printer is desired. However, such a convenient machine has not been introduced yet because of the reasons as described above.

SUMMARY OF THE INVENTION

An object of the present invention is to provide an image forming apparatus usable for either copying machines or printers which can be manufactured inexpensively and sufficiently thin and small size by skillfully arranging various devices.

Another object of the present invention is to provide a more convenient image forming apparatus capable of performing image forming operation by manually inserting and feeding thick or irregular size sheets without causing any trouble and yet it can be manufactured sufficiently thin and small in size.

These and other objects and features of the present invention will become more apparent from the following description taken in conjunction with the preferred embodiments thereof with reference to the accompanying drawings.

BRIEF DESCRIPTION OF THE DRAWINGS

FIG. 12 is a sectional view of the image forming apparatus showing a state when transport system and each unit are being put in action.

It is to be noted that like parts are shown by like reference characters throughout the embodiments and repeated descriptions will be omitted.

DESCRIPTION OF THE PREFERRED EMBODIMENTS

Figure 1:
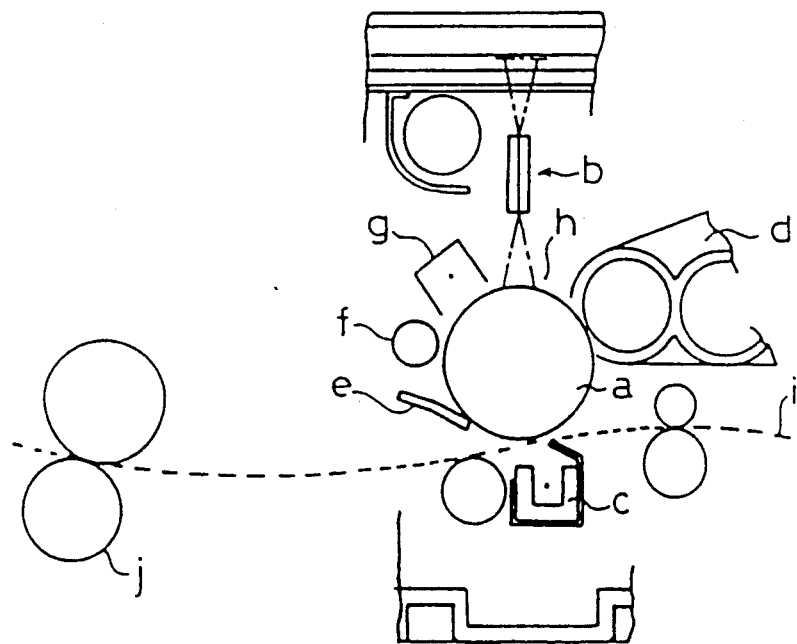
FIG. 1 is a sectional view showing the main part of a conventional copying machine in which a photoconductive drum is utilized.

Description will now be made on several embodiments of the present invention referring to the accompanying drawings, FIGS. 2 through 12.

The FIGS. 2 through 10 show a first embodiment of an image forming apparatus to which the present invention is applied. The image forming apparatus is arranged for a combined use in a flat and small-sized copying machine and a printer. As illustrated in the FIG. 2, the apparatus is provided with a flat body 1 which is laterally long in section. The body 1 is comprised of upper block 5 and lower block 8 which is disposed below the upper block 5. In the upper block 5, a photoconductor 2 is disposed, and around the photoconductor 2, there are disposed a developing unit 3 and a fixing unit 4 as major units. In the lower block 8, a paper feed section 6 and a laser print head 7 are arranged in alignment along the upper block 5.

Substantially in the central portion of the upper block 5, the endless-belt shaped photoconductor 2 is disposed. The photoconductor 2 is flatly stretched crosswise along the longitudinal direction of the upper block 5 by a driving roller 3b and a driven roller 3a arranged at both sides of the photoconductor 2. A moving type original table 9 is disposed on the body 1. The original table 9 is moved when a pinion 11 on the side of the body 1 which engages with a rack 10 mounted on the table 9 is driven. In the upper portion of the upper block 5, an exposure optical system 12 for copying operation is arranged so as to be positioned under the original table 9. The exposure optical system 12 provided for copying operation is arranged to expose through a slit an original image placed on the moving original table 9 onto the photoconductor 2.

The exposure optical system 12 comprised of a lamp 13 for illuminating an original, a convergent light transmitting member 14 for projecting an illuminated original image on the photoconductor 2 and mirrors 15,16 for folding the projecting light path.

The lamp 13 is accommodated in a housing 17 which is disposed just at the left end of the photoconductor 2 for collecting the light of the lamp 13 at a predetermined position, while the light transmitting member 14 which is of multi-lens type or fiber type is disposed sideways just above and at the left end of the photoconductor 2. The mirror 15 is disposed on the left side of the light transmitting member 14 to guide the light from an original to the light transmitting member 14, while the mirror 16 is disposed on the right side of the light transmitting member 14 to guide the light emitted from the light transmitting member 14 onto the photoconductor 2. The exposure optical system 12 arranged in such a manner as described above is thus accommodated compactly above and along the left end portion of the photoconductor 2. Especially, the space above the photoconductor 2 becomes smaller.

Figure 2:
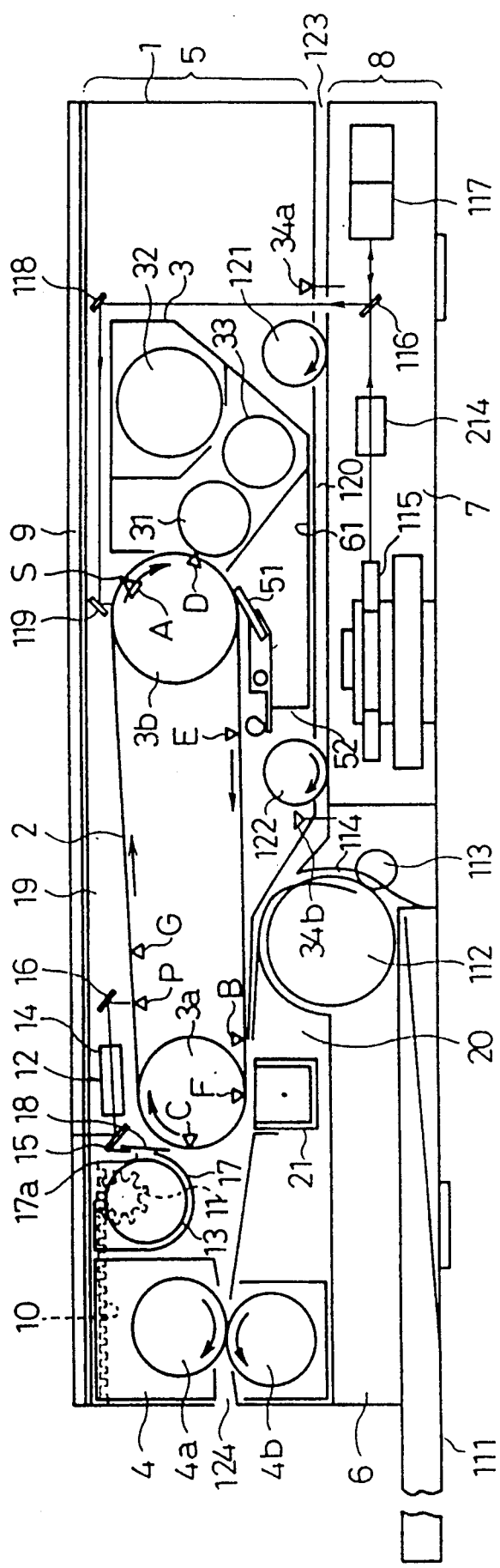
FIG. 2 is a sectional view showing an embodiment of an image forming apparatus to which the present invention is applied.
Figure 5:
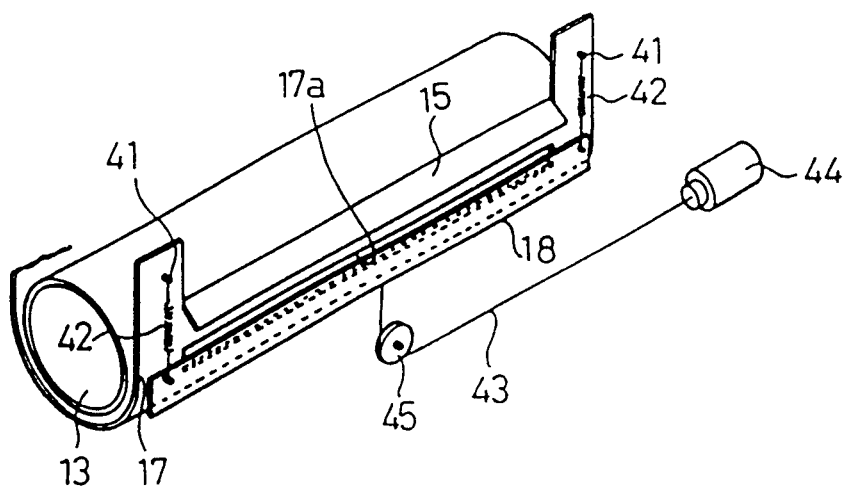
FIG. 5 is a perspective view of shutter mechanism in a light source section of the image forming apparatus.

As illustrated in the FIGS. 2 and 5, there is arranged a light projecting slit 17a at the position where the housing 17 faces the photoconductor 2. The light projecting slit 17a is prepared for projecting light of the lamp 13 directly to the photoconductor 2 to erase the remained charge on the photoconductor 2. Accordingly, it is not necessary to specially prepare a light source for erasing the charge on the photoconductor 2.

In the light projecting slit 17a, a shutter 18 is provided to close the light projecting slit 17a at least when an image is being exposed in order not to obstruct image exposure. As shown in the FIG. 5, the upper edge of the shutter 18 is, therefore, connected with pins 41,41 provided on both end walls of the housing 17 through springs 42,42, while a lower edge at the central portion is connected to a solenoid 44 which is disposed on the outside of an inner side wall in the body 1 through a wire 43 which is folded 90° by a pulley 45 on the way. The shutter 18 is thus held in the well-balanced state among the three members of the solenoid 44 and pins 41,41. When the solenoid 44 is being turned off, the shutter 18 is pulled up to the upper position by the spring 42 to close the light projecting slit 17a, while when the solenoid 44 is turned on, the shutter 18 is moved downward against the spring 42 to open the light projecting slit 17a.

Just the left side of the lamp 13 which is positioned on the left side of the photoconductor 2, there is disposed a fixing unit 4, while just on the right side of the photoconductor 2, a developing unit 3 is disposed.

The fixing unit 4 and the developing unit 3 are formed substantially in the same height and are laterally aligned almost on the same line with the photoconductor 2. The photoconductor 2 is stretched more flatly than the fixing unit 4 and developing unit 3, and long spaces 19 and 20 are laterally formed between the original table 9, and between the paper feed section 6 and laser print head 7 respectively.

The space 19 is utilized for disposing the light transmitting member 14 and the mirrors 15,16 on both sides of the light transmitting member 14. In the space 20, there are disposed a cleaner 51 and a charger 21 which is properly used as a charging device and a transfer device during a period the photoconductor 2 makes two rounds of rotation clockwise in the direction of arrow shown in the FIG. 2.

The cleaner 51 is positioned just beside the developing unit 3 at downstream side of rotation of the photoconductor 2 and is held by a casing 52 of the developing unit 3 as illustrated in the FIG. 2.

Figure 6:
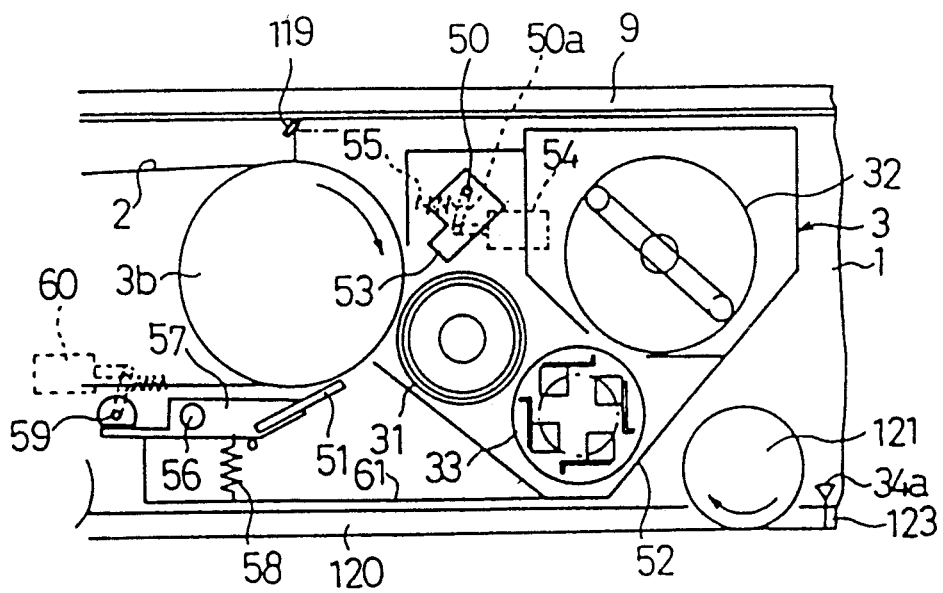
FIG. 6 is a sectional view, partly enlarged, of the image forming forming apparatus showing a state of a developing device when developing operation is conducted.
Figure 7:
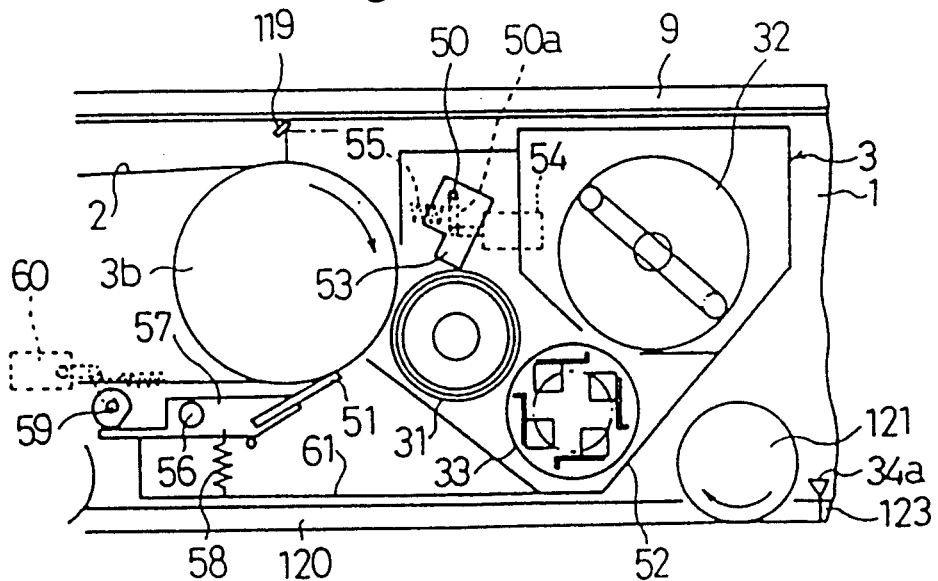
FIG. 7 is a sectional view, partially enlarged, of the image forming apparatus showing a state when a cleaner is being put for cleaning operation.

As shown in the FIGS. 2, 6 and 7, the developing unit 3 comprises a developing roller 31 which is positioned in close vicinity to the photoconductor 2 with proper gap therebetween, a transport roller 33 for feeding developer including toner and carrier to the developing roller 31 by stirring and charging the developer in circulative transportation of the developer, and a toner hopper 32 for supplying toner to the transport roller 33. The developing roller 31 includes therein a magnetic member having a plurality of magnetic pole to absorb the developer fed thereto and transports it to the portion opposite to the photoconductor 2 by rotation. The developer fed by the developing roller 31 is further stirred and charged by magnetic field which is produced by the magnetic pole of the magnetic member, and ear of the developer at the portion opposite to the photoconductor 2 is formed by the magnetic pole. When the ear of developer came in contact with the surface of the photoconductor 2, the toner is electrically attracted by an electrostatic latent image formed on the surface of the photoconductor 2 and the electrostatic latent image is developed.

The developing unit 3 is provided with a developer scratching member 53 which is supported by a shaft 50 in a manner to come in contact with or move away from the developing unit 3. As illustrated in the FIGS. 6 and 7, the scratching member 53 is connected to the solenoid 54 which is attached to the outside of the inner plate of the developing unit 3 through the shaft 50 and its driven arm 50a and a restoring spring 55 is being activated. The scratching member 53 is thus kept away from the developing roller 31 by the spring 55 when the solenoid 54 is turned off, and developing operation is not obstructed by the scratching member 53. When the solenoid 54 is turned on, the scratching member 53 is pressed in contact with the developing roller 53 against the energy of the spring 55 to scrape off the developer remained on the developing roller 31. Accordingly, the developing roller 31 whose periphery is cleaned by the scratching member 53 faces the photoconductor 2. Eventually, any foreign substance such as paper powder stuck to the surface of the photoconductor 2 can be avoided from getting into the developing unit 3 by contact of the ear of developer on the developing roller 31 with the photoconductor 2. The developer scratching can be simply performed after the developing unit 3 has finished its developing operation. The above description has been made for two component developer consisted of magnetic carrier and toner, however, one component developer may also be utilized.

The developing unit 3 is further arranged to be able to take out its housing 52 with the cleaner 51 as one unit. The cleaner 51 is attached to the leading end of a lever 57 pivotally supported by a shaft 56. The lever 57 is pressed in contact with a cam shaft 59 by a spring 58, and when the cam shaft 59 is positioned in the direction shown in FIG. 7 by turning off of a solenoid 60 connected, the lever is moved away from the photoconductor 2 by the energy of the spring 58 since the pressing movement of the lever 57 is released. Under the state, a visualized image formed on the photoconductor 2 is not damaged by the cleaner 51, and the photoconductor 2 is protected from damage when developing unit 3 is taken in and out of the body 1. When the cam shaft 59 is positioned as shown in FIG. 7 by turning on of the solenoid 60, the lever is pressed to move a little against the spring 58 from the state shown in the FIG. 6, and the cleaner 51 is pressed in contact with the photoconductor 2 to be ready for cleaning operation of the photoconductor 2. The solenoid 60 is also attached to the outside of inner side plate of the body 1. The toner scraped off by the cleaner 51 is dropped into a toner receiver 61 formed in a portion of the casing 52 and is accommodated therein. Accordingly, the developing unit 3 which handles toner and the cleaner 51 are simply handled as one unit, and the problem of overflow of toner and the like is also reduced.

Furthermore, by temporarily raising the electric potential of developing bias to be applied to the developing roller 31 higher than the surface electric potential of the photoconductor 2, the developing unit 3 functions as a cleaner 51 and it can perform cleaning operation. In this case, the cleaner 51 in the FIG. 2 is not required and the apparatus can be manufactured small in size and light in weight since only the developing unit 3 is provided.

The apparatus can thus be simplified by properly using the charger 21 as a charging device and a transfer device, and the photoconductor 2 is completely cleaned by the cleaner 51 not replying on the developing unit.

The cleaner 51 is positioned just beside the developing unit 3 at downstream side of the rotation of the photoconductor 2 and functions to the photoconductor at almost the same position of the developing unit 3. At the time when a developing operation by the developing unit 3 is finished, cleaning operation can be started by changing over to a state of cleaning so that the time lag between image forming process and cleaning operation is almost eliminated.

In the paper feed section 6, there is provided a paper feed cassette 111 and a pick-up roller 112 for sending out a transfer sheet accommodated in the paper feed cassette 111 one by one. A pinch roller 113 is pressed in contact with the pick-up roller 112, and the transfer sheet sent out by the pick-up roller 112 is forwarded into a transfer section between the photoconductor 2 and the charger 21 along the pick-up roller 112, and the transfer sheet is further transported to a pair of fixing rollers 4a,4b of the fixing unit 4. Reference numeral 114 represents a U-turn path for feeding the transfer sheet.

The laser print head 7 transmits a modulated laser beam emitted from an unillustrated laser oscillator corresponding to an image signal, and the laser beam reaches an fθ mirror 117 passing through a rectifying lens 214 and a half mirror 116 after it has been deflectively reflected within a predetermined range of angle at a polygon mirror 115 which is rotatively driven through an unillustrated collimator lens and the like. The laser beam reflected at the fθ mirror is rectified in uniform velocity and is guided onto the photoconductor 2 through the half mirror 116, mirrors 118 and 119 to scan in uniform velocity in the direction to traverse the photoconductor 2. The photoconductor 2 is driven in the direction of arrow to perform sub-scanning movement, and an electrostatic latent image corresponding to an image signal is formed by successively receiving the main scanning at a predetermined pitch.

The optical path of the laser beam after the half mirror 116 is extended from the lower block 8 wherein the head 7 is provided into upper block 5 along the rear portion of the developing unit 3, and it is folded by the mirror 118 at the position just above the developing unit 3 along the upper portion of the developing unit 3, and reaches the upper end portion where the photoconductor 2 is hung on the driving roller 3, and is then directed to the photoconductor 2 side by the mirror 119. Consequently, the optical path is guided onto the photoconductor 2 by utilizing an extremely small space along the developing unit 3.

By providing a gap between the head 7 in the lower block 8 and the developing unit 3 in the upper block 5, a straight path 120 is formed extending from the right side of the body 1 to the U-turn path 114 for manually inserting papers. In the straight path 120, there are arranged transport rollers 121 and 122 at the positions not to interfere with others.

The transport rollers 121 and 122 are driven when a switch 34a has detected a sheet manually inserted. When a switch 34b has detected that the sheet had reached the position of the transport roller 122, the sheet is stopped for a predetermined time. This arrangement is made to deal with time lag since image forming process onto the photoconductor delays than paper feed process. In other words, timing is regulated so as to have the leading end of a visualized image formed on the photoconductor after developing process coincide with the leading end of the sheet manually inserted. In the case when a sheet is fed from the paper feed cassette 111, register of the leading ends of an image and the sheet are conducted by the driving timing of the pick-up roller 112 since the sheet can be fed without having timing disorder by the pick-up roller 112 and pinching transport method of the pinch roller 113.

In the straight path 120, any size of transfer sheets may be used since the method for feeding transfer sheets is different from that of feeding transfer sheets from the paper cassette 111 wherein transfer sheets can be forwarded into the transfer section and the fixing unit 4 straight without having the sheets U-turned, and therefore, even post cards and other thick papers can be supplied without any trouble.

Figure 3:
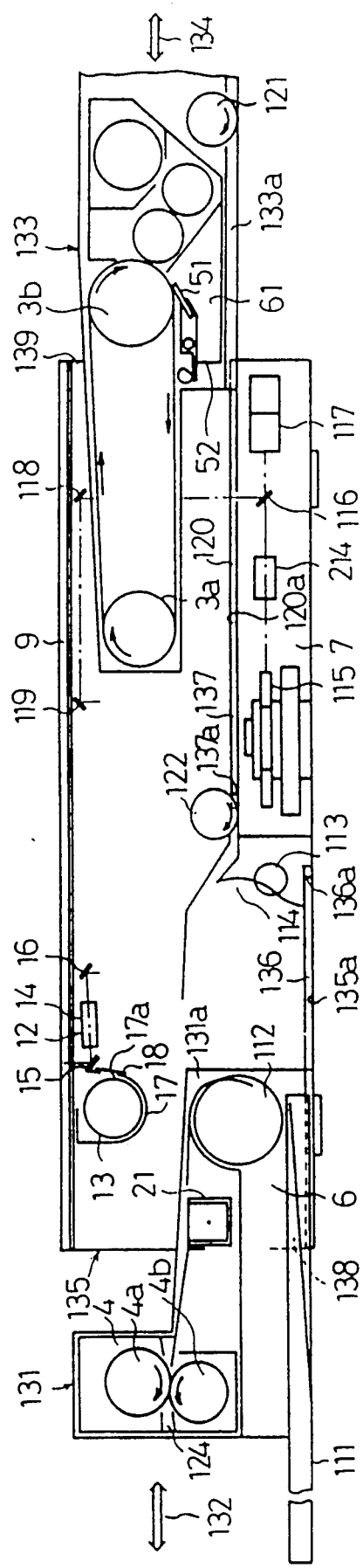
FIG. 3 is a sectional view of the image forming apparatus showing a state wherein transport system and each unit are being put in action.

As shown in the FIG. 3, among the devices accommodated in the body 1, the fixing unit 4, paper feed section 6 and charger 21 constitute a unit of transfer system 131, and is arranged to be removable from the body 1 in the direction of arrow 132. Furthermore, the paper feed cassette 111 is removably mounted on the unit 131.

On the other hand, the photoconductor 2, developing unit 3 and cleaner 51 constitute a process unit 133, which is arranged to be removable from the body 1 in the direction of arrow 134. Furthermore, the developing unit 3 and the like are arranged to be removable from the unit 133. In a body unit 135 in which the units 131 and 133 are accommodated, only the exposure optical system 12, laser beam print head 7, transfer roller 122 and pinch roller 113 are fixedly disposed.

Figure 4:
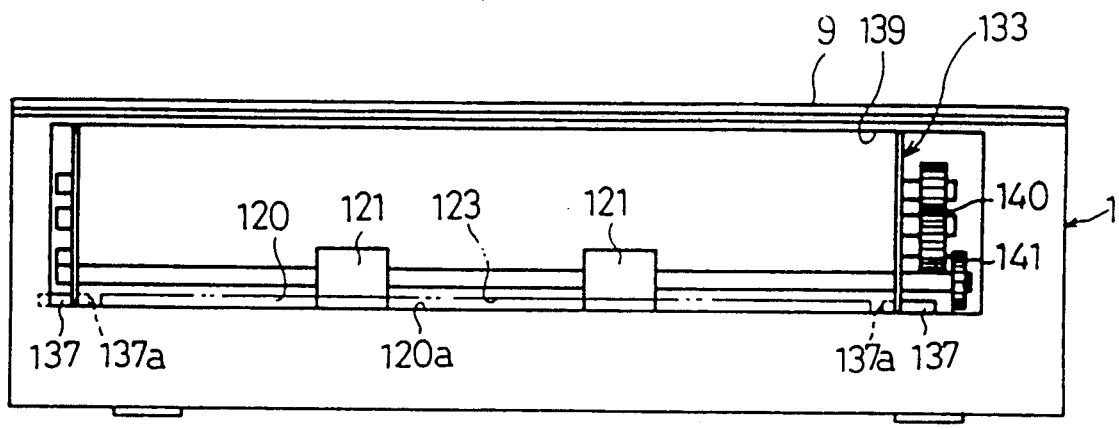
FIG. 4 is a right side view of the image forming apparatus.

As illustrated in the FIGS. 3 and 4, the units 131 and 133 are provided with respective side plates 131a and 133a, and they are slidably guided onto a bottom plate 135a of the body unit 135 and a bottom plate 120a of the straight path 120 respectively to install or remove them from openings 138 and 139. Above the bottom plates 135a and 120a, there are provided guide rails 136 and 137 to guide the units 131 and 133 through which both units 131 and 133 are properly guided and stably removed. At the inner end portions of the guide rails 136 and 137, there are provided stoppers 136a and 137a to which the units 131 and 133 are struck so that the units 131 and 133 are mounted at proper positions. The operating sections of each unit 131 and 133 are connected or disconnected with driving mechanisms mounted on the body unit 135 when they are installed or removed.

FIG. 4 shows a state where a rear plate of the process unit 133 is removed so that a driven gear 140 of the developing unit 4 and a driven gear 141 of the transport roller 121 are seen. Since the units 131 and 133 can thus be removed, it is convenient for checking and repairing each section. A jam can also be readily disposed of since the U-turn path 144 and straight path 120 are opened when the units 131 and 133 are removed (refer to the FIG. 3). In the FIG. 2, reference numeral 123 represents a paper feed opening for manually inserting paper and 124 a paper discharge outlet.

Now, description will be made on copying operation.

Firstly, an original is placed on the original table 9. When an unillustrated copy button is pressed, an illustrated motor starts rotation to drive the photoconductor 2, original table 9 and fixing unit 4 and the lamp 13 is lit. When the original table 9 is driven, it first moves to a scan starting position by its returning action. The charger 21 is turned on simultaneously with the returning action of the original table 9 to start charging the photoconductor 2. Before the charged portion reaches the position of the light projecting slit 17a, the shutter 18 is closed to make it possible to conduct exposure without erasing the charged portion.

On the other hand, the direction of movement of the original table 9 is changed from returning action to scanning movement to expose the leading end of an original simultaneously with the timing the charged portion of the photoconductor 2 has reached the exposure position, and thus an original on the original table is successively exposed from its leading end on the photoconductor 2. The developing unit 3 is then driven just before the leading end of exposed portion of the original reaches the developing section. When the photoconductor 2 on which developing process has been finished is reached the position immediately before the cleaner 51, the cleaner 51 is moved away from the photoconductor 2.

Then, the pick-up roller 112 is rotated in simultaneous timing wherein the leading end of a visualized image and the leading end of a transfer sheet coincide with each other. The transfer sheet is thus forwarded in a manner to have its leading end coincide with the leading end of the visualized image on the photoconductor 2 and the sheet reaches the charger 21. At this stage, the charger 21 functions as a transfer unit and the visualized image on the photoconductor 2 is transferred onto the transfer sheet.

The transfer sheet after transfer process is separated from the photoconductor 2 and sent into the fixing unit 4. The transferred visualized image on the transfer sheet is fixed hereat and the sheet is thereafter discharged onto the sheet discharging outlet 124.

The shutter 18 is opened at the time when the projecting light from the light projecting slit 17a does no longer affect the exposed rear end portion of the original on the photoconductor 2. The remained electric charge on the photoconductor 2 after transfer process is thus erased. The cleaner 51 is pressed in contact with the photoconductor 2 at a predetermined timing after the developing unit 3 has finished its developing action, and the photoconductor 2 is cleaned, while the developing roller 31 receives an action from the scratching member 53 for a predetermined period of time after developing process has been finished.

Figure 8:
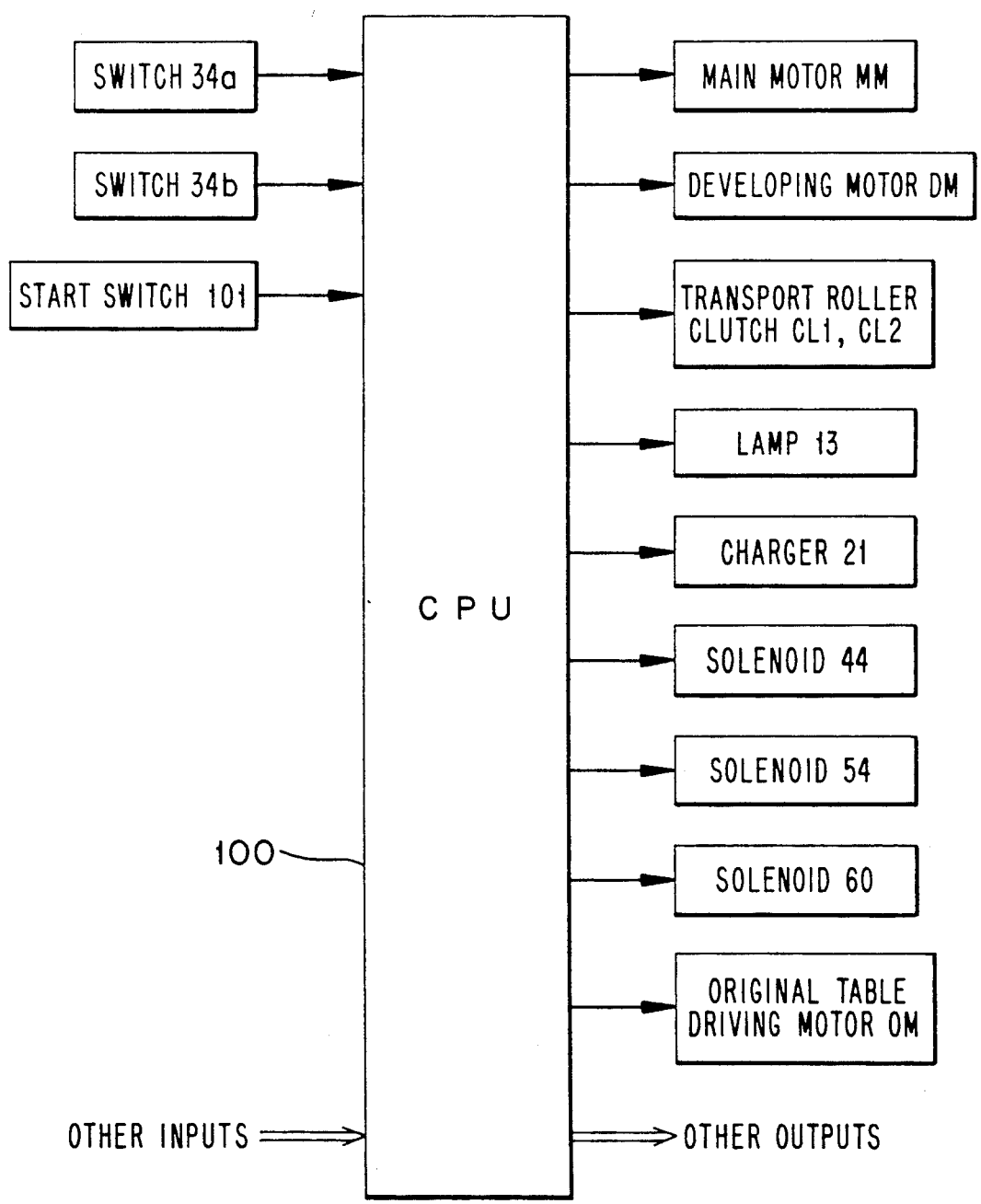
FIG. 8 is a block diagram of a control circuit.

The operation control is conducted by the CPU 100 as illustrated in the FIG. 8.

To the input side of the CPU 100, a start switch 101 which is operated by a copy button, switches 34a and 34b are connected, while to the output side, there are connected a main motor MM for driving an endless-belt shaped photoconductor 2, a fixing unit 4, transport rollers 121, 122 and the like, a developing motor DM for driving the developing unit 3, an original scan motor OM for driving the original table 9, clutches CL1 and CL2 for properly turning on and off the transport rollers 121, 122, and solenoids 44, 54, 60 and the like for operating the lamp 13, charger 21, shutter 18, developer scratching member 53 and the cleaner 51.

Figure 9:
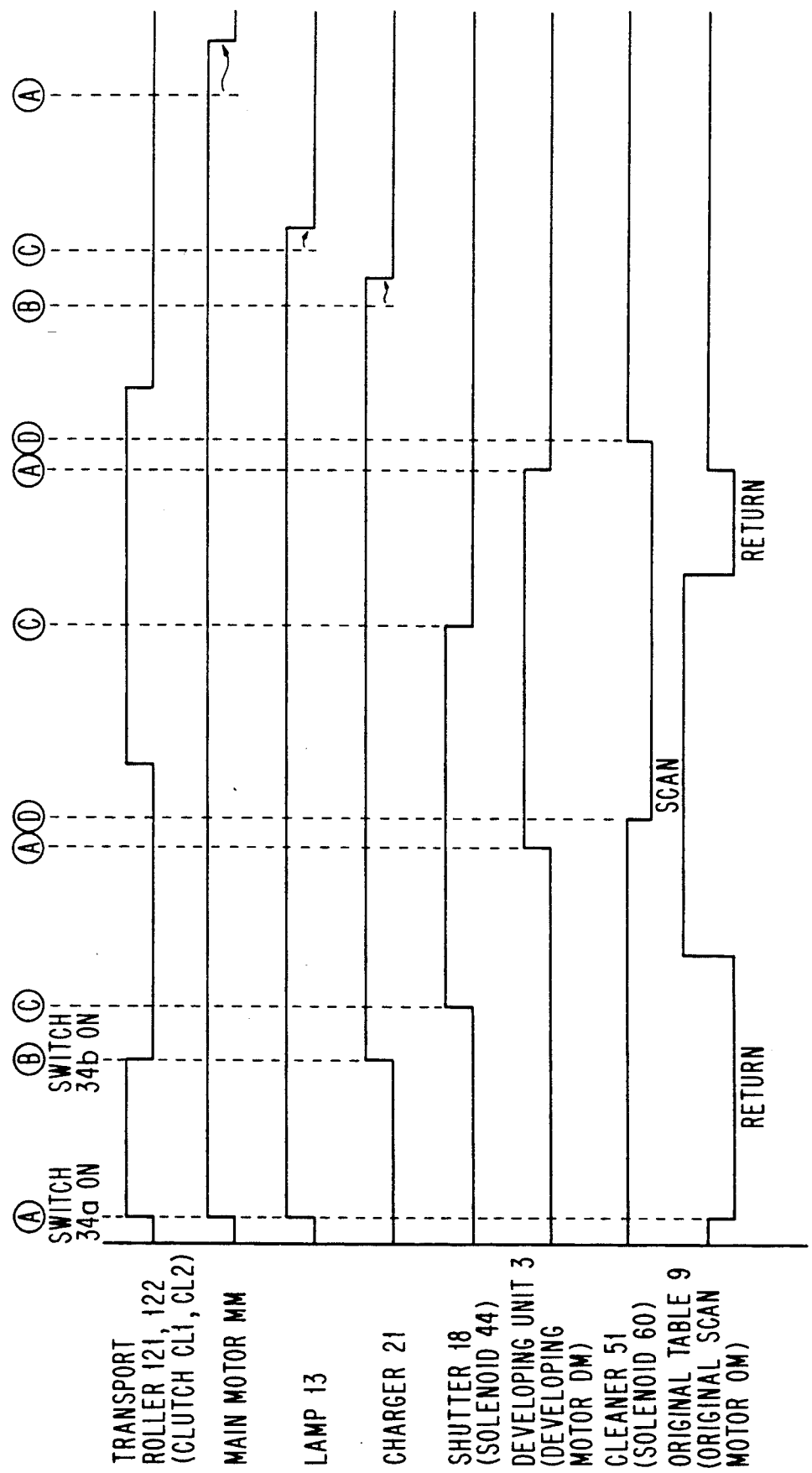
FIG. 9 is a time chart showing actions of the main devices.

FIG. 9 shows a time chart for the main operations described above wherein sheets are manually inserted and supplied. Referring to the figure, each operational timing will now be described in detail basing on a typical diagram of moving locus at the starting point of image forming process of the photoconductor 2 shown in the FIGS. 2 and 10.

When there is a distance of 20 cm for the original table 9 to return at the time when the switch 34a is turned on, the point A in the FIG. 2 which is 20 cm upstream side from exposure point P becomes a starting point of image forming position. Accordingly, when a copy starting position S of the photoconducter 2 is reached a point B adjacent to the position where the copy sheet and photoconductor 2 come in contact with each other, the charger 21 is turned on, and the portion after the S point of image forming position is surely charged. The S point of the photoconductor 2 which has reached the point B is further moved and when it has reached a point C, the shutter 18 is closed whereby the light projected from the light projecting slit 12a is kept not to erase the electrification. When the point S made one round and reached the point A, the developing unit 3 starts operation, and when the point S is further moved to the point D, the cleaner 51 is moved away from the photoconductor 2. When the point S is reached a point E where it coincides with the leading end of a copy sheet in the transport rollers 121, 122, the transport rollers 121, 122 start rotation to forward the copy sheet. A visualized image is thereafter transferred onto the copy sheet at F point of the transfer position. The transfer sheet is moved away from the photoconductor 2 and is forwarded to the fixing unit 4.

When the point S has reached the point C, the shutter 18 is opened to start erasing operation, and when the point S has reached the point A, the operation of the developing unit 3 is finished. Upon arrival of the point S at the point D, cleaning operation is started and the photoconductor 2 is driven until the copy sheet is discharged out of the body 1. The main motor is stopped when the point S has reached the point G, and consequently, all operations are stopped. It may also be feasible to only stop the drive of the photoconductor 2.

Figure 10:
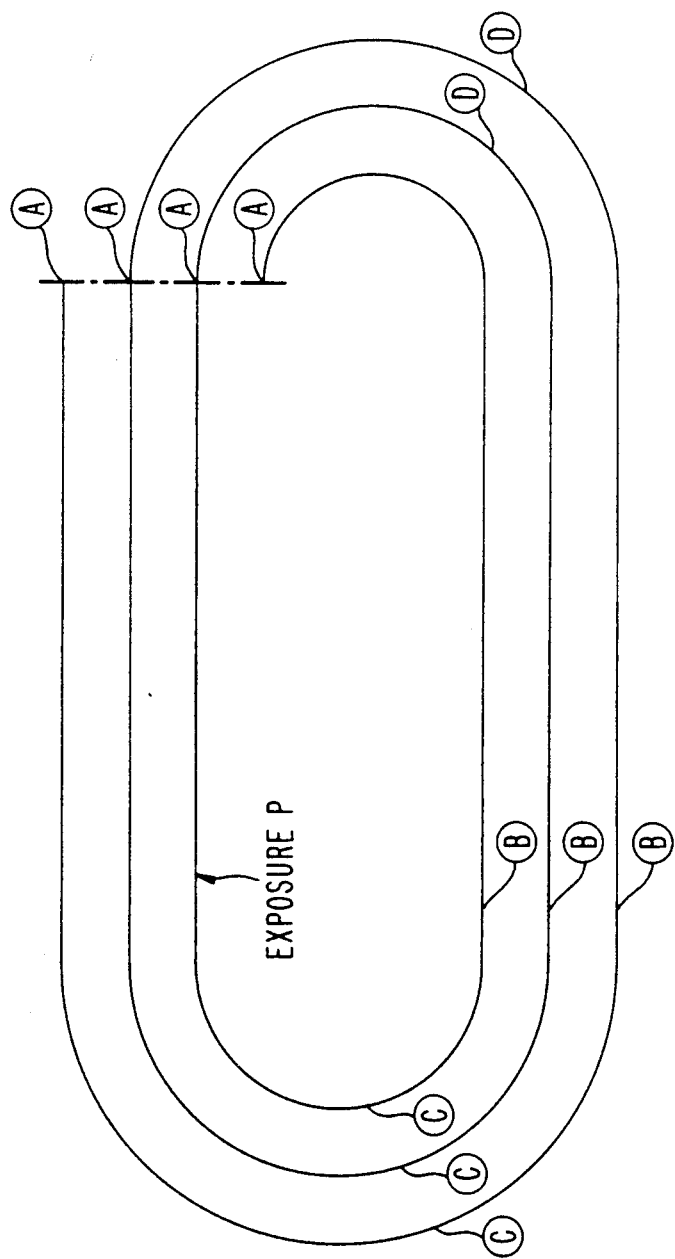
FIG. 10 is a diagrammatic view typically showing a locus of movement at a starting point of image forming operation of a belt-shaped photoconductor.

To sum up, at a first round of (A)-(B)-(C)-(A) in the FIG. 10, the photoconductor 2 is wholly charged and partially exposed, and at a second round of (A)-(D)-(B)-(C)-(A), the remained part of exposure, development and transfer process are performed to complete a copying operation. At a third round of (A)-(D)-(B)-(C)-(A), the photoconductor 2 is wholly erased and cleaned as after treatment of the photoconductor 2.

Copying operation has been described in the foregoing description, however, printing operation by use of a print head 7 may also be carried out in the same image forming process and operational sequence with only a time lag because of the positional change for exposure where laser exposure is conducted.

In the above embodiment, description has been made on how to keep the ear of toner of the magnetic brush on the developing roller 31 away from the photoconductor 2 when the developing unit 3 is not being operated for developing process. It may also be arranged to retract the developing unit 3 itself. It may further be arranged to control the direction of magnetic member so as not to have magnetic pole of the developing roller 31 face the photoconductor 2.

In the above embodiment, a moving type original table is described, however, a scanning exposure type original table may also be utilized in which an original is transported by roller or the like for scanning exposure.

Figure 11:
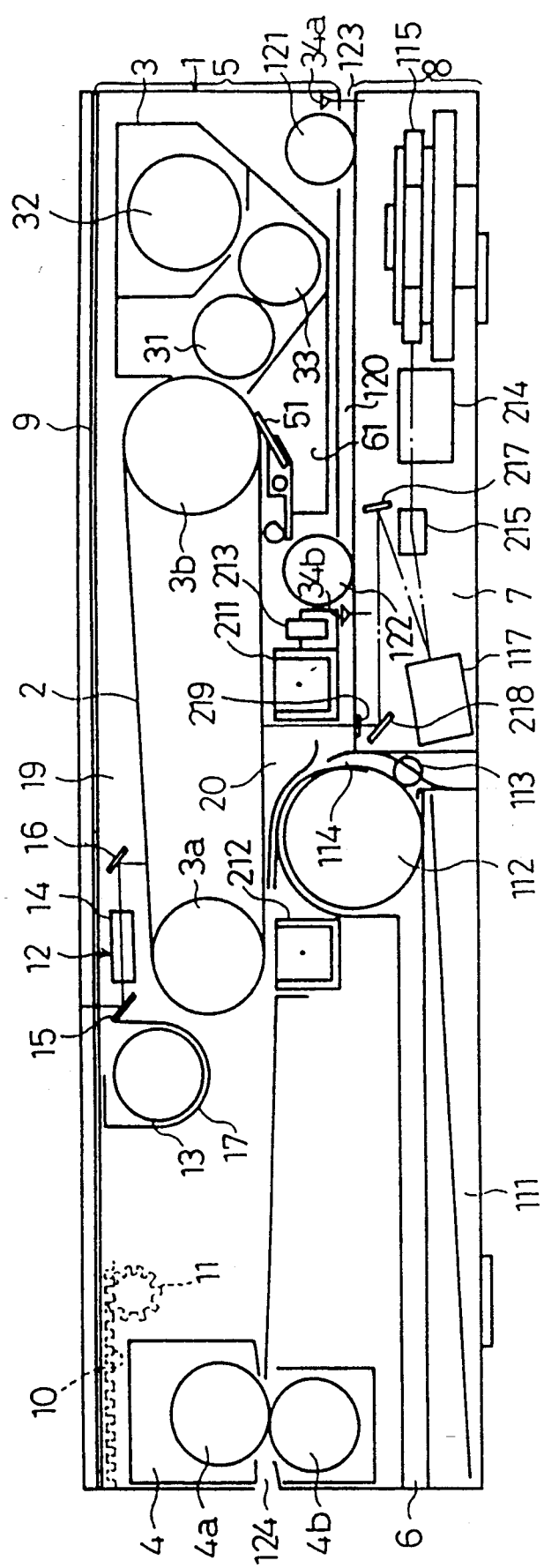
FIG. 11 a sectional view showing a second embodiment of an image forming apparatus to which the present invention is applied.

FIGS. 11 and 12 show a second embodiment of the present invention.

In this embodiment, a charger 211 and a transfer charger 212 are separately provided around a belt-shaped photoconductor 2, and an eraser 213 which is consisted of LED array is additionally provided, which differs from the first embodiment. In this case, a space 20 is effectively utilized, and therefore, it does not cause the body to become large.

A laser print head 7 is arranged to perform exposure from the lower position just before downstream side of the charger 211 in the direction of movement of the photoconductive drum 2 on the side of paper feed section, which also differs from the first embodiment. With adoption of this exposure optical path, the laser print head 7 guides a laser beam deflectively reflected by a polygon mirror 115 to just under exposure section of the photoconductor 2 through two of rectifying lenses 214, 215, fθ mirror 117, and a mirror, and here at this position, the laser beam is further guided to the photoconductor 2 by another mirror 218.

The mirror 218 is positioned diagonally just below a slit bored through a bottom plate 120a for the optical path extending toward the photoconductor 2, and it is liable that the mirror is stained by dirt such as paper power which drops from the slit. A dust-proof filter 219 is, therefore, provided in order to protect the mirror 218 from the dust. The dust-proof filter 219 is formed by a transparent glass sheet of below 1 mm which completely covers the slit portion. With this arrangement, the dust such as paper powder, toner and the like is attracted onto the dust-proof filter 219 and does not enter into the laser print head 7. The dust attracted can be readily cleaned by removing a process unit 133.

In the embodiment described above, description has been made on a moving type original table, however, scanning exposure type original table may also be utilized in which an original is transported by roller or the like for scanning exposure.

As it is clear from the description made above, according to the present invention, an endless-belt shaped photoconductor, developing unit and fixing unit are aligned almost on the same line, and the photoconductor can be stretched more flatly than the developing unit and fixing unit. Within a space between the developing unit and fixing unit, the photoconductor can be accommodated with other image forming devices which are to be disposed around the photoconductor, and those devices are accommodated within the height of the developing unit or the fixing unit. Since an exposure section provided for copying operation is provided on one side, and a paper feed section and laser print head on the other side, the whole body can be made thin and small and eventually the manufacturing cost is reduced. Moreover, by using the exposure section and laser print head selectively, an image forming operation as a copying machine or image forming operation as a printer can be carried out.

There is arranged a manual paper feed path along the laser print head traversing the exposure optical path extending from the laser print head to the photoconductor. Since the paper feed path is formed straight, the structure is not complicated without requiring any special space, and thick and any size of sheet can be supplied for copying operation.

Although the present invention has been gully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus, comprising:

a belt photoconductor;
an original table for supporting an original;
means for charging the photoconductor;
optical system for projecting an image of the original onto the photoconductor;
a laser scan unit for generating a laser beam to scan the photoconductor;
a paper feed unit for feeding sheets disposed in alignment with the laser scan unit;
a developing unit for developing an electrostatic latent image formed on the photoconductor disposed between the laser scan unit and the original table;
means for transferring a toner image formed on the photoconductor onto a sheet;
a fixing unit for fixing the toner image onto the sheet disposed between the paper feed unit and the original table;
said photoconductor, developing unit and fixing unit being arranged inalignment; and
means for stretching the photoconductor between the developing unit and the fixing unit so that the stretched photoconductor is thinner than the developing unit and the fixing unit.

2. The image forming apparatus as defined in claim 1, wherein the stretching means stretches the photoconductor more flatly than the developing unit and the fixing unit so as to make a space for disposing an optical system between the original table and the photoconductor.

3. The image forming apparatus as defined in claim 1, further comprising a laser beam guiding means for guiding a laser beam emitted from the laser scan unit to the photoconductor passing through the outside of the developing unit and between the original table and the developing unit.

4. The image forming apparats as defined in claim 1, further comprising:
laser guiding means for guiding a laser beam emitted from the laser scan unit to the photoconductor; and
a paper feed path disposed between the developing unit and the laser scan unit for manually inserting and feeding sheets by traversing the optical path formed by the laser guide means.

5. The image forming apparatus as defined in claim 1, wherein the charging means and transfer means are composed of a common charger disposed opposite to the photoconductor.

6. The image forming apparatus as defined in claim 5, wherein the stretching means stretches the photoconductor more flatly than the developing unit and the fixing unit so as to form spaces for disposing the optical system between the original table and the photoconductor and for disposing a charger between the paper feed unit and the photoconductor.

7. An image forming apparatus, comprising:
a belt photoconductor;
an original table for supporting an original to be movably scanned;
means for charging the photoconductor;
a first optical unit for projecting an image of the original onto the photoconductor;
a laser scan unto for generating a laser beam to scan the photoconductor;
a developing unit disposed between the original table and the laser scan unit for developing an electrostatic latent image formed on the photoconductor;
a paper feed unit for feeding sheets;
means for transferring a toner image formed on the photoconductor onto a sheet;
a fixing unit disposed between the original table and the paper feed unit for fixing the toner image onto the sheet;
said photoconductor, developing unit and fixing unit being arranged in alignment;
means for stretching the photoconductor between the developing unit and the fixing unit so that the stretched photoconductor is thinner than the developing unit and the fixing unit to thereby form spaces for disposing the first optical unit between the original table and the photoconductor and for disposing the charging means between the paper feed unit and the photoconductor; and
a second optical path for guiding a laser beam emitted from the laser scan unit o the photoconductor passing through the outside of the developing unit and between the original table and the developing unit.

8. An image forming apparatus, comprising:
a casing;
an original table movably disposed relative to the casing for scanning an original;
a belt photoconductor disposed at the upper central portion of the casing;
means for charging the photoconductor;
an optical system for projecting an image of original onto the photoconductor;
a laser scan unit for generating a laser beam to scan the photoconductor;
a paper feed unit for feeding sheets disposed in alignment with the laser scan unit in the lower portion of the casing, said paper feed unit and said laser scan unit constituting a first block;
a developing unit disposed opposite to the photoconductor for developing an electrostatic latent image formed on the photoconductor;
means for transferring a toner image formed on the photoconductor onto the sheet;
a fixing unit disposed on the other side of the developing unit with respect to the photoconductor for fixing a toner image onto the sheet, said fixing unit, said developing unit and the photoconductor constituting a second block; and
means for stretching the photoconductor between the developing unit and the fixing unit so that the stretched photoconductor is thinner than the developing unit and the fixing unit by which the height of the second block is regulated according to the height of the developing unit and the fixing unit.

9. The image forming apparatus as defined in claim 8, wherein at least the photoconductor and the developing unit are removably mounted in the casing unitarily.

10. The image forming apparatus as defined in claim 8, wherein at least the paper feed unit and the fixing unit are removably mounted in the casing unitarily.

11. The image forming apparatus as defined in claim 8, wherein at least the photoconductor and the developing unit and at least the paper feed unit and the fixing unit are removably mounted unitarily in the casing respectively.

12. The image forming apparatus as defined in claim 8, wherein the optical system is disposed in a space formed between the photoconductor and the original table to be included in the first block.

13. The image forming apparatus as defined in claim 8, wherein a transport path for manually feeding sheets if formed between the first block and the second block.

14. The image forming apparatus as defined in claim 8, wherein said optical system is disposed between the photoconductor and the fixing unit.

15. An image forming apparatus, comprising:
a belt photoconductor;
an original table provided on the top of the apparatus for supporting an original;
a laser scan unit provided at the bottom of the apparatus for generating a laser beam to scan the photoconductor;
a paper feed unit provided at the bottom of the apparatus for feeding sheets in alignment with the laser scan unit;
means for stretching the photoconductor between the original table and the laser scan unit;
a developing unit for developing an electrostatic latent image formed on the photoconductor;
a fixing unit for fixing the toner image onto the sheet;
said developing unit, photoconductor and fixing unit being arranged in alignment;
charging means for charging the photoconductor; and
optical system for projecting an image of the original onto the photoconductor,
wherein said stretched photoconductor is thinner than the developing unit and the fixing unit to thereby form spaces for disposing the optical system between the original table and the photoconductor and for disposing the charging means between the paper feed unit and the photoconductor.

16. The image forming apparatus as defined in claim 15, wherein at least the photoconductor and the developing unit are removably mounted in the apparatus unitarily.

17. The image forming apparatus as defined in claim 15, wherein at least the paper feed unit and the fixing unit are removably mounted in the apparatus unitarily.

18. The image forming apparatus as defined in claim 15, further comprising:
laser guiding means for guiding a laser beam emitted from the laser scan unit to the photoconductor; and
laser guiding means for guiding a laser beam emitted from the laser scan unit to the photoconductor; and
a paper feed path disposed between the developing unit and the laser scan unit for manually inserting and feeding sheets by traversing the optical path formed by the laser guide means.

* * * * *